United States Patent
Dudar et al.

(10) Patent No.: US 10,704,433 B2
(45) Date of Patent: Jul. 7, 2020

(54) ENGINE OIL WARM UP USING INDUCTIVE HEATING

(71) Applicant: Ford Global Technologies, LLC, Dearborn, MI (US)

(72) Inventors: Aed M. Dudar, Canton, MI (US); Kenneth Miller, Pinckney, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/111,100

(22) Filed: Aug. 23, 2018

(65) Prior Publication Data

US 2020/0063614 A1 Feb. 27, 2020

(51) Int. Cl.
*F01M 5/02* (2006.01)
*B60L 53/12* (2019.01)
(Continued)

(52) U.S. Cl.
CPC ............ *F01M 5/021* (2013.01); *B60L 53/12* (2019.02); *F01M 1/02* (2013.01); *F01M 5/001* (2013.01); *F01M 5/007* (2013.01); *F01M 5/025* (2013.01); *G05D 1/0088* (2013.01); *H05B 6/108* (2013.01); *B60L 2240/54* (2013.01); *B60L 2260/58* (2013.01); *B60Y 2200/92* (2013.01); *B60Y 2300/91* (2013.01); *B60Y 2400/112* (2013.01); *F01M 2005/008* (2013.01)

(58) Field of Classification Search
CPC .. F01M 5/021; F01M 2005/023; F01M 5/025; F01M 2005/026; F16N 39/04; Y02T 90/122; Y02T 90/125; B60L 53/12; B60L 53/126; H02J 7/025; H02J 50/90
See application file for complete search history.

(56) References Cited

U.S. PATENT DOCUMENTS 3,330,935 A 7/1967 Wells
3,394,243 A 7/1968 Lee
(Continued)

FOREIGN PATENT DOCUMENTS

CN 103573329 A 2/2014
DE 3323091 A1 * 1/1985 ............. F01M 5/021
(Continued)

OTHER PUBLICATIONS

EPO machine translation of SU 823610 (original SU document dated Apr. 23, 1981) (Year: 1981).*

(Continued)

*Primary Examiner* — Faris S Almatrahi
*Assistant Examiner* — David A Testardi
(74) *Attorney, Agent, or Firm* — Geoffrey Brumbaugh; McCoy Russell LLP

(57) ABSTRACT

Methods and systems are provided for preemptively heating engine oil prior to an engine start using an inductive heating mat. In one example, a method may include coupling a magnetic field between a primary coil housed in the inductive heating mat and a ferrous oil pan to inductively heat engine oil contained in the oil pan. While maintaining engine oil temperature above a threshold temperature, heated engine oil may then be circulated through engine components to warm up the engine prior to engine start.

20 Claims, 6 Drawing Sheets

(51) Int. Cl.
- *F01M 5/00* (2006.01)
- *F01M 1/02* (2006.01)
- *G05D 1/00* (2006.01)
- *H05B 6/10* (2006.01)

(56) References Cited

U.S. PATENT DOCUMENTS

| | | | | |
|---|---|---|---|---|
| 4,370,956 | A * | 2/1983 | Moser | F01M 5/021 123/142.5 R |
| 4,499,365 | A | 2/1985 | Puziss | |
| 6,029,621 | A * | 2/2000 | Berels | F01M 5/025 123/196 S |
| 6,655,342 | B1 * | 12/2003 | Wendels | F01M 1/20 123/196 R |
| 9,073,442 | B2 | 7/2015 | Ichikawa | |
| 9,945,752 | B2 | 4/2018 | Dudar | |
| 10,011,182 | B2 * | 7/2018 | Salter | B60L 11/1829 |
| 10,041,449 | B2 | 8/2018 | Dudar | |
| 10,065,517 | B1 * | 9/2018 | Konrardy | B60L 53/36 |
| 2002/0148433 | A1 * | 10/2002 | Rossiter | F01M 5/00 123/196 AB |
| 2004/0007403 | A1 * | 1/2004 | Tomatsuri | B60K 3/00 180/65.235 |
| 2006/0289236 | A1 * | 12/2006 | Nishino | F01L 1/02 184/6.1 |
| 2007/0131505 | A1 | 6/2007 | Kim | |
| 2007/0222542 | A1 * | 9/2007 | Joannopoulos | H01Q 9/04 333/219 |
| 2008/0275600 | A1 * | 11/2008 | Rask | B60K 6/24 701/22 |
| 2010/0280698 | A1 * | 11/2010 | Ichikawa | B60L 58/12 701/22 |
| 2013/0249682 | A1 | 9/2013 | Van Wiemeersch et al. | |
| 2014/0247009 | A1 * | 9/2014 | Doepke | B60K 6/40 320/108 |
| 2015/0330351 | A1 * | 11/2015 | Ragazzi | F02N 19/04 123/552 |
| 2015/0348335 | A1 * | 12/2015 | Ramanujam | G07C 5/006 701/23 |
| 2015/0360577 | A1 * | 12/2015 | Greenwood | H02J 7/025 320/108 |
| 2017/0167909 | A1 * | 6/2017 | Dudar | G01L 27/002 |
| 2017/0274787 | A1 * | 9/2017 | Salter | B60L 11/1829 |
| 2018/0037126 | A1 * | 2/2018 | Jang | B60L 53/39 |
| 2018/0038074 | A1 * | 2/2018 | Nishihata | F16H 57/04 |
| 2018/0304761 | A1 * | 10/2018 | Chase | G05D 1/0291 |
| 2018/0347418 | A1 * | 12/2018 | Miyazaki | F01M 5/007 |
| 2018/0347419 | A1 * | 12/2018 | Furuishi | F01M 1/16 |

FOREIGN PATENT DOCUMENTS

| | | | | |
|---|---|---|---|---|
| DE | 102007055494 A1 * | 5/2009 | | F01M 5/021 |
| FR | 2922259 A1 * | 4/2009 | | F01M 5/001 |
| FR | 2922259 A1 | 4/2009 | | |
| FR | 3031139 A1 * | 7/2016 | | |
| GB | 2500691 A * | 10/2013 | | |
| GB | 2500820 A * | 10/2013 | | |
| GB | 2510126 A * | 7/2014 | | |
| JP | 02119606 A * | 5/1990 | | F01M 5/021 |
| JP | 2010268664 A * | 11/2010 | | |
| SU | 823610 B * | 4/1981 | | |

OTHER PUBLICATIONS

EPO machine translation of FR 2922259 (original FR document dated Apr. 17, 2009) (Year: 2009).*

EPO machine translation of DE 102007055494 (original DE document dated May 28, 2009) (Year: 2009).*

JPO machine translation of JP 2010-268664 (original JP document dated Nov. 25, 2010) (Year: 2010).*

Wikipedia article, "Electromagnetic absorbers", Old revision dated Jan. 5, 2017, 2 pages (Year: 2017).*

Wikipedia article, "Induction heating", Old revision dated Jun. 19, 2018, 7 pages (Year: 2018).*

* cited by examiner

ENGINE OIL WARM UP USING INDUCTIVE HEATING

FIELD

The present description relates generally to methods and systems for warming up engine oil and engine prior to vehicle operation, using inductive heating.

BACKGROUND/SUMMARY

Viscosities of engine oils (engine oil and transmission oil) have direct effect on engine and transmission friction, which in turn affect engine idle speed, engine torque output, and gear changes. At lower temperatures, viscosities of the engine oils may be inversely proportional (logarithmically) to temperature. For example, at lower temperatures (higher viscosity) an increased throttle opening (engine airflow) and fuel may be required to achieve a given engine idle speed or engine torque output compared to running the same engine at a higher temperature (lower viscosity). Further, engine starts at low ambient temperatures (cold starts) may adversely affect emissions quality.

Various approaches are provided for accelerated heating of engine oil and engine during an engine start. In one example approach, as shown in U.S. Pat. No. 4,499,365, Puziss shows a portable heater for heating an underbody of a vehicle during cold weather conditions. By supplying heat to the underbody by using a radiant energy generator, such as an infrared lamp or an electric resistance element, engine oil pan and/or crankcase may be heated.

However, the inventors herein have recognized potential disadvantages with the above approach. As one example, in a plug-in hybrid vehicle, the engine may not be in operation for a significant portion of a drive cycle. Therefore, excess engine heat may not be available to warm up the engine oil. Therefore, in order to heat the engine oil, the portable heater may have to be used for a prolonged duration. Use of an external heater may increase parasitic loss of battery power, thereby decreasing the electric-only range of the vehicle and increasing fuel consumption.

The inventors herein have recognized that the issues described above may be addressed by an engine method comprising: prior to an engine start, inductively heating engine oil by coupling a magnetic field between a primary coil external to a vehicle and a ferrous oil pan or a ferrous member coupled to the oil pan, and circulating heated engine oil from the oil pan through one or more engine components during the heating. In this way, by inductively heating an engine oil pan using a charging mat, engine oils and the engine may be preemptively warmed up prior to engine operation.

As one example, an inductive charging mat may be used for wirelessly charge a battery of a plug-in hybrid vehicle. When a vehicle is parked on the charging mat, the on-board battery may be inductively charged without having to physically plug in the vehicle. During charging of the battery, a magnetic field may be created between a primary coil external to the vehicle (on the charging mat) and a secondary coil onboard the vehicle. The magnetic field from the primary coil may be further coupled to a ferrous engine oil pan or a ferrous member coupled to the pan. The magnetic field may cause eddy currents to be induced in the ferrous oil pan or a ferrous member coupled to the pan, thus generating heat. Autonomous vehicles may be able to self-align the vehicle body over the charging mat for recharging the battery and/or warming up engine oils prior to a scheduled vehicle operation. Once the engine oil temperature increases to above a threshold temperature, the heated engine oil may be circulated through the engine components to preemptively heat the engine prior to an actual engine start. During circulation through the engine, if the oil temperature reduces to below the threshold temperature, the oil circulation through the engine may be deactivated and the oil may be continued to be heated until the oil temperature increases to the threshold temperature.

In this way, by preemptively warming engine oil and engine via inductive heating, engine friction may be reduced during engine start, thereby improving engine efficiency. By heating the engine prior to an engine start, cold start emissions may be reduced. The technical effect of using a charging mat to inductively heat the engine oil pan is that engine and engine oil pan heating may be accomplished without the requirement of any additional hardware. Therefore, battery charge may not have to be spent for operating an additional heater. By using self-driving capabilities of an autonomous vehicle, engine oil warm up may be carried out prior to a scheduled vehicle start without intervention of an operator. Overall, by effectively warming the engine and engine oil prior to engine operation, range of operation of a plug-in hybrid vehicle, fuel efficiency, and emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
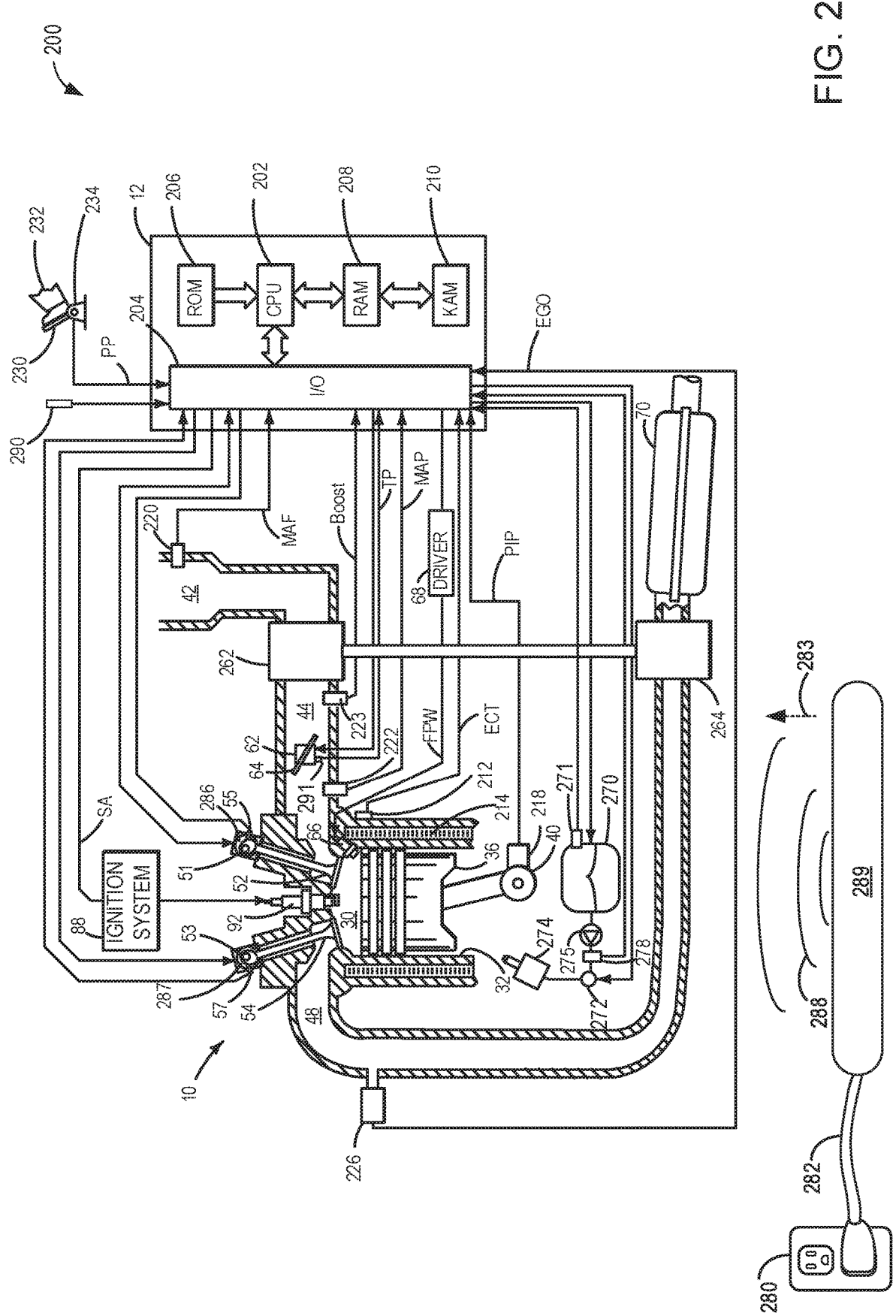
FIG. 2 schematically shows an example vehicle system with an engine oil pan.
Figure 3:
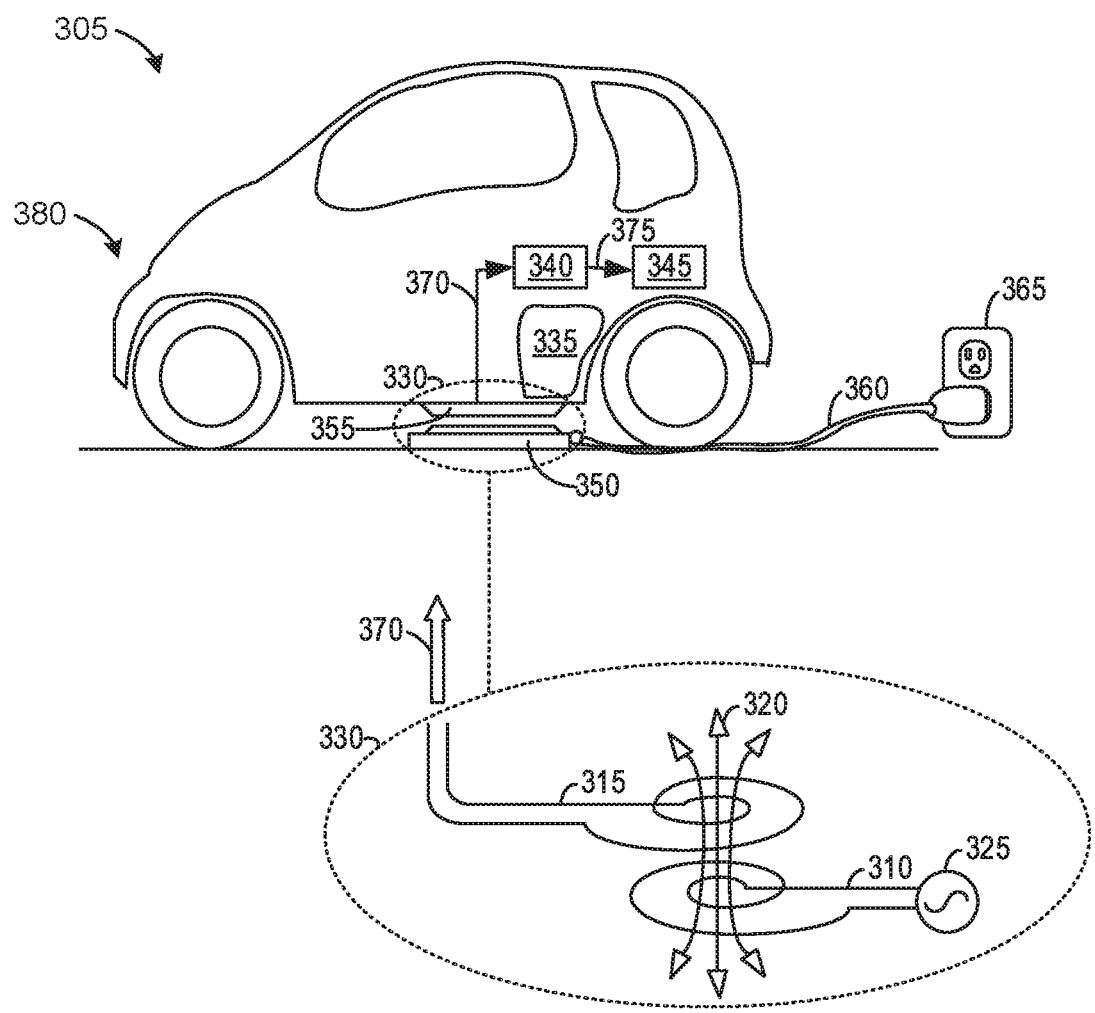
FIG. 3 schematically shows an inductive charging system for a vehicle.
Figure 4:
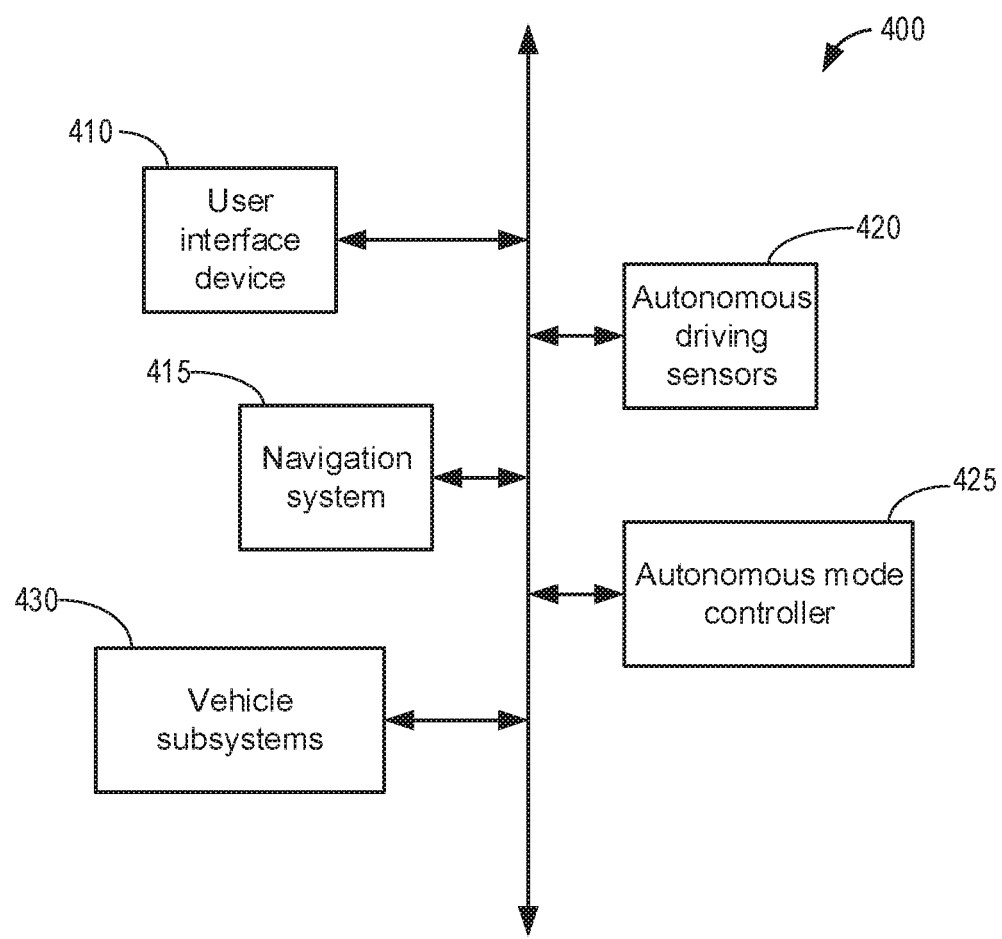
FIG. 4 schematically illustrates a block diagram of an example autonomous driving system.

The following description relates to systems and methods for preemptively warming up engine oil and engine via inductive heating using an external charging mat. The systems and methods may be applied to a vehicle system capable of inductive charging of the vehicle battery, and inductive heating of the engine oil pan, such as the hybrid vehicle system depicted in FIG. 1. In one example, a primary coil external to the vehicle may be positioned in close proximity to the engine oil pan, wherein the engine oil pan is coupled to the engine, as depicted in FIG. 2. An alternating current (AC) power source may supply power to the primary coil, thus generating a magnetic field such that an alternating current is induced in a secondary coil, which may then be converted into direct current (DC) for charging a battery, as depicted in FIG. 3. Further, the magnetic field generated from the primary coil may produce eddy currents at the engine oil pan, thus heating the engine oil pan. Positioning of the vehicle on a charging mat in some examples be carried out in an autonomous vehicle that is not occupied, where FIG. 4 depicts an example autonomous vehicle control system. An engine controller may be configured to perform a control routine, such as the example routine of FIG. 5, to inductively heat engine oil and then circulate heated engine oil through the engine to warm up the engine prior to an engine start. An example heating of the engine oil and the engine is shown in FIG. 6.

Figure 1:
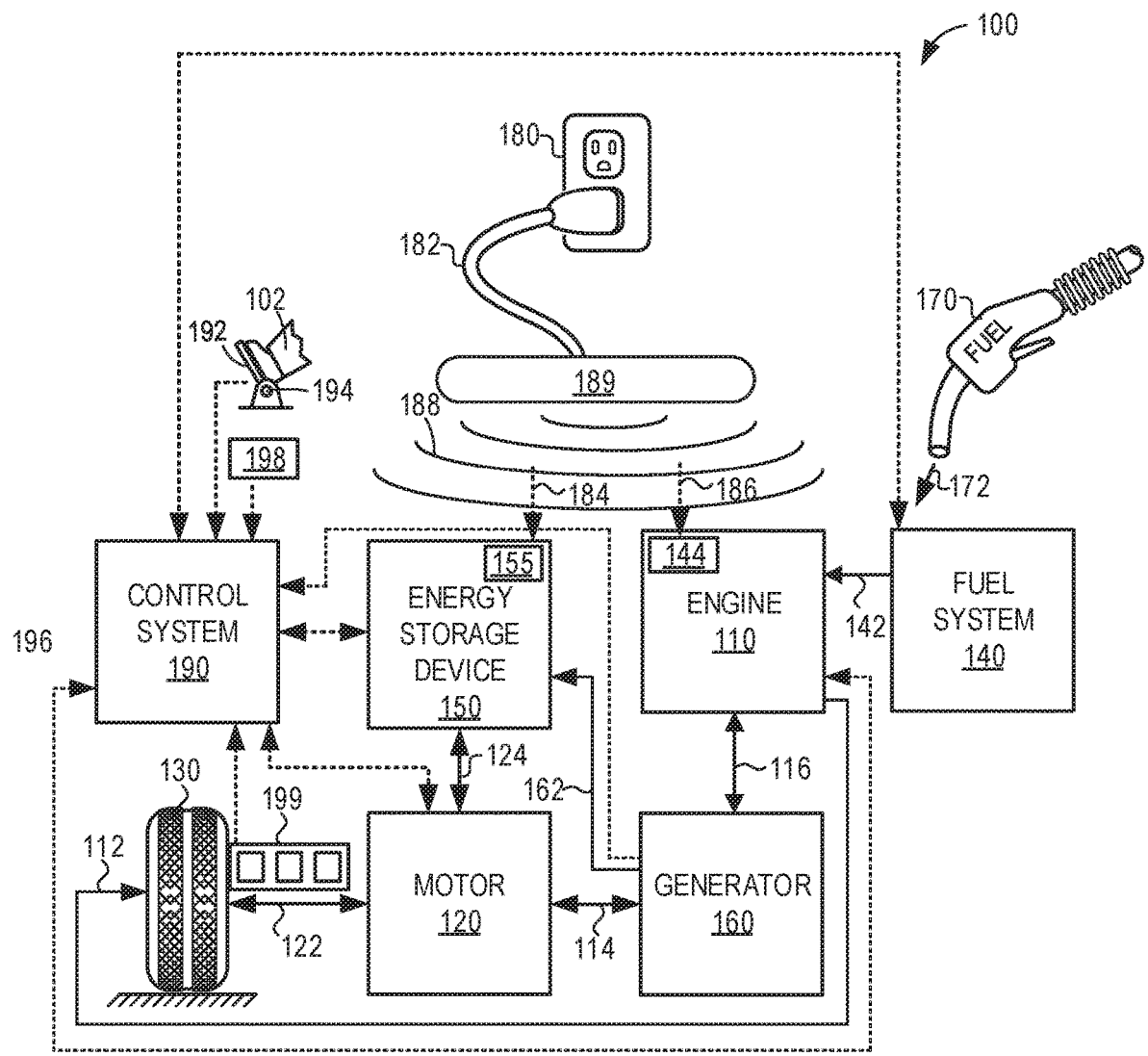
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks for storing fuel on-board the vehicle. For example, fuel tank may store one or more liquid fuels, including but not limited to: gasoline, diesel, and alcohol fuels. In some examples, the fuel may be stored on-board the vehicle as a blend of two or more different fuels. Engine 110 may include an engine oil pan 144 containing engine oil. During engine operation, engine oil from the engine oil pan 144 may be circulated through the engine components to lubricate the engine components and reduce friction. By reducing friction amongst engine components, such as between the cylinder walls and the piston, energy consumption may be reduced and fuel efficiency may be improved. At higher temperature, engine oil may have a lower viscosity leading to a more effective lubricating capability.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle). As a non-limiting example, vehicle propulsion system 100 may be configured as a plug-in hybrid electric vehicle (HEV), whereby electrical energy may be supplied to energy storage device 150 from power source 180 via an electrical energy transmission cable (not shown). While the vehicle propulsion system is operated to propel the vehicle, electrical transmission cable may be disconnected between power source 180 and energy storage device 150. Control system 190 may identify and/or control the amount of electrical energy stored at the energy storage device, which may be referred to as the state of charge (SOC).

In other embodiments, physical connection between power source 180 and the vehicle via an electrical transmission cable may be omitted, where electrical energy may be received wirelessly at energy storage device 150 from power source 180. In one example, an alternating current (AC) power source 180 may supply power to a charging mat 189 via an electrical transmission cable 182. AC power supplied to the charging mat 189 may generate a magnetic field 188 that may be transmitted to the vehicle, indicated by arrow 184, wherein the alternating current may be converted into direct current via an AC/DC rectifier 155 for storage at energy storage device 150. As such electrical energy may be received wirelessly from power source 180 via electromagnetic induction. Moreover, it may be appreciated that energy storage device 150 may receive electrical energy from power source 180 via any suitable approach for recharging energy storage device 150 from a power source that does not comprise part of the vehicle. In this way, motor 120 may propel the vehicle by utilizing an energy source other than the fuel utilized by engine 110.

In one example, charging mat 189 may be positioned in close proximity to engine oil pan 144. If the engine oil pan 144 is comprised of ferrous material, as in the oil pan of a PHEV, the magnetic field 188 generated by charging mat 189 may inductively heat the oil pan 144, indicated by arrow 186. In other examples, for instance an engine oil pan comprised of aluminum or plastic, magnetic field 188 generated during an inductive charging operation may be coupled to a ferrous member (not shown) that in turn may be coupled to the engine oil pan such that the oil pan may in turn be heated. As will be described in further detail below with regard to the systems discussed in FIGS. 2-3, and in regard to the method described in FIG. 5, inductive heating of engine oil pan 144 may facilitate in preemptively heating engine oil and the engine prior to an upcoming engine operation. In one example, transmission oil may also be inductively heated by the magnetic field 188 generated by charging mat 189 if an oil pan containing transmission oil is designed to be proximal to the vehicle floor.

FIG. 2 is a schematic diagram 200 showing one cylinder of multi-cylinder engine 10, which may be included in a propulsion system of an automobile. Engine 10 may be controlled at least partially by a control system including controller 12 and by input from a vehicle operator 232 via an input device 230. In this example, input device 230 includes an accelerator pedal and a pedal position sensor 234 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. For example, valve operation may be varied as part of pre-ignition abatement or engine knock abatement operations. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In one example, cam actuation systems 51 and 53 are variable cam timing systems that include cam phasers 286 and 287 that are hydraulically actuated via oil from a variable flow oil pump 275. Under some conditions, an output flow rate of variable flow oil pump 275 may be varied to control a response time for cam phasers 286 and 287 to change a position of the cams based on operating conditions. For example, under high engine loads, the output flow rate of the variable flow oil pump 275 may be increased, so that the cam phasers 286 and 287 change position more quickly and correspondingly change a position of the cams more quickly than under low engine loads.

Engine 10 may further include a compression device such as a turbocharger or supercharger including at least a compressor 262 arranged along intake manifold 44. For a turbocharger, compressor 262 may be at least partially driven by a turbine 264 (e.g. via a shaft) arranged along exhaust passage 48. For a supercharger, compressor 262 may be at least partially driven by the engine and/or an electric machine, and may not include a turbine. Thus, the amount of compression provided to one or more cylinders of the engine via a turbocharger or supercharger may be varied by controller 12. A boost sensor 223 may be positioned downstream of the compressor in intake manifold 44 to provide a boost pressure (Boost) signal to controller 12.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30. Fuel injector 66 may be controlled to vary fuel injection in different cylinder according operating conditions. For example, controller 12 may command fuel injection to be stopped in one or more cylinders as part of pre-ignition abatement operations so that combustion chamber 30 is allowed to cool. Further, intake valve 52 and/or exhaust valve 53 may be opened in conjunction with the stoppage of fuel injection to provide intake air for additional cooling.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 220 and a manifold air pressure sensor 222 for providing respective signals MAF and MAP to controller 12.

Ignition system 88 can provide an ignition spark to combustion chamber 30 via spark plug 92 in response to spark advance signal SA from controller 12, under select operating modes. Controller 12 may vary signal SA based on operating conditions. For example, controller may retard signal SA in order to retard spark in response to an indication of engine knock as part of engine knock abatement operations. Though spark ignition components are shown, in some embodiments, combustion chamber 30 or one or more other combustion chambers of engine 10 may be operated in a compression ignition mode, with or without an ignition spark.

Engine oil may be stored in an oil pan (such as a reservoir 270). Engine oil may be circulated through various regions and/or components of engine 10 to provide cooling and lubrication, thereby reducing friction amongst engine components. In turn, engine friction influences engine torque output and engine idle speed. Reduction in frictional losses during engine operation results in energy conservation and improved fuel efficiency. Also, lower friction reduces wear of engine components. Sensor 271 may provide an indication of oil temperature or oil viscosity to controller 12. One or more of these sensors may provide an indication of an engine oil temperature that may be used by controller 12 to estimate the amount of engine oil to be circulated through the engine components. A variable flow oil pump 275 may circulate engine oil from the oil pan 270 to the engine cylinder 30 via the oil injector 274.

Oil injector 274 may be coupled downstream of an output of the variable flow oil pump 275 to selectively receive oil from the oil pan 270. In some embodiments, the oil injector 274 may be omitted, or it may be incorporated into the combustion chamber walls 32 of the engine cylinder and may receive oil from galleries formed in the walls. The oil injector 274 may be operable to inject oil from the oil pan 270 onto an underside of piston 36. The oil injected by oil injector 274 provides cooling effects to the piston 36. Furthermore, through reciprocation of piston 36, oil is drawn up into combustion chamber 30 to provide cooling effects to walls of the combustion chamber 30. Moreover, oil injector 274 provides oil for lubrication of an interface between piston 36 and combustion chamber 30.

A valve 272 may be positioned between the output of the variable flow oil pump 275 and the oil injector 274 to control flow of oil to the oil injector 274. In some embodiments, the check valve may be integrated into the assembly of the oil injector 274. In some embodiments, the valve 272 may be an electronically actuatable valve that is controlled by controller 12. The valve 272 may be actuatable to enable/disable operation of oil injector 274.

Variable flow oil pump 275 may be coupled to crankshaft 40 to provide rotary power to operate the variable flow oil pump 180. In one example, the variable flow oil pump 275 includes a plurality of internal rotors (not shown) that are eccentrically mounted. At least one of the internal rotors can be controlled by controller 12 to change the position of that rotor relative to one or more other rotors to adjust an output flow rate of the variable flow oil pump 275 and thereby adjust the oil pressure. For example, the electronically controlled rotor may be coupled to a rack and pinion assembly that is adjusted via the controller 12 to change the position of the rotor. The output flow rate or oil pressure of the variable flow oil pump 275 may be adjusted by the controller 12 to accommodate varying operating conditions to provide varying levels of cooling and/or lubrication. Further, the oil pressure output from the variable flow oil pump 275 may be adjusted to reduce oil consumption and/or reduce energy consumption by the variable flow oil pump 275. It will be appreciated that any suitable variable flow oil pump configuration may be implemented to vary the oil pressure and/or oil output flow rate.

Further, controller 12 may receive an indication of oil pressure from pressure sensor 278 positioned downstream of an output of variable flow oil pump 275. The oil pressure indication may be used by the controller 12 to control adjustment of oil pressure by varying an output flow rate of variable flow oil pump 275. Oil pressure and oil flow rates output by variable flow oil pump 275 may be a function of engine oil viscosity. As previously discussed, these factors further influence engine friction, such as the friction between cylinder 30 and cylinder walls 32, or friction between crankshaft 40 and its bearings.

Viscosity of engine oil may be inversely proportional to temperature. Therefore, during a cold engine start, the engine oil viscosity may be high causing the rate of oil flow through the engine components to be sluggish compared to the rate of oil flow with lower viscosity engine oil. Also, during a cold start, the engine components are cold. The higher viscosity engine oil circulating through a cold engine may increase frictional losses in the engine. Therefore, it is desired to preemptively increase engine oil temperature and engine temperature prior to an engine start.

In one example, as described above with regard to the vehicle system depicted in FIG. 1, a power source 280 may be coupled to a charging mat 289 via an electrical transmission cable 282. Power supplied to the charging mat 289 may generate a magnetic field 288 that may be transmitted to the vehicle in order to wirelessly charge a vehicle battery via an inductive charging operation. When the vehicle is positioned over the charging mat 289, a ferrous engine oil pan 270 may be inductively heated, indicated by arrow 283, where heat generated in the engine oil pan 270 may in turn heat the engine oil. Inductively heating engine oil may include the magnetic field caused by a primary coil housed in the charging mat 289 generating eddy currents at a surface of the oil pan, and the eddy currents generating thermal energy for heating the engine oil contained in the pan. In other examples, where the fuel tank comprises an aluminum or plastic fuel tank, a ferrous member may instead be inductively charged in order to heat the fuel tank.

In one example, the vehicle may be an autonomous vehicle, and immediately prior to inductively heating engine oil, the autonomous vehicle may be moved, without interference from a human driver, to position the oil pan directly above the primary coil of the charging mat 289. In response to engine oil temperature increasing to above the threshold temperature, an oil pump may be operated to circulate engine oil from the oil pan through the engine, the oil pump operation may be paused in response to the engine oil temperature reducing to below the threshold temperature, and then the oil pump operation may be resumed to circulate engine oil through the engine in response to the engine oil temperature increasing to the threshold temperature.

Preemptive heating of engine oil may also be beneficial prior to an engine oil change. As previously discussed, viscosity of hot engine oil is lower than cold engine oil and it is difficult to drain cold, high viscous engine oil during servicing. In one example, if an engine oil change is due and a drive cycle to a service station has been scheduled, the oil pan may be inductively heated prior to engine start. By preemptively heating the engine oil before the vehicle reaches the service station, during servicing of the engine, drainage of lower viscosity hot engine oil may be improved.

Exhaust gas sensor 226 is shown coupled to exhaust passage 48 upstream of emission control device 70. Sensor 26 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 226. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air-fuel ratio.

Controller 12 is shown in FIG. 1 as a microcomputer, including microprocessor unit 202, input/output ports 204, an electronic storage medium for executable programs and calibration values shown as read only memory chip 106 in this particular example, random access memory 208, keep alive memory 210, and a data bus. Controller 12 may receive various signals from sensors coupled to engine 10, in addition to those signals previously discussed, including measurement of inducted mass air flow (MAF) from mass air flow sensor 220; a profile ignition pickup signal (PIP) from Hall effect sensor 218 (or other type) coupled to crankshaft 40; throttle position (TP) from throttle position sensor 291; engine coolant temperature (ECT) from temperature sensor 212; engine oil temperature from temperature sensor 271; and absolute manifold pressure signal, MAP, from sensor 222. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft. Moreover, these sensors may be used to derive an indication of engine load.

The controller 12 may receive input data from the various sensors, process the input data, and trigger various actuators in response to the processed input data based on instruction or code programmed therein corresponding to one or more routines. The actuators may include flow oil pump 275, intake valve 52, exhaust valve 54, and engine oil flow control valve 272. In one example, prior to engine start and during inductive warming of engine oil, the controller 12 may monitor engine oil temperature via temperature sensor 271 and in response to the engine oil temperature increasing to above a threshold temperature, the controller may actuate the pump 275 and open the engine oil flow control valve 272 to circulate warm engine oil through the engine for engine warm up prior to engine start.

FIG. 3 schematically shows an induction charging system for a vehicle. As shown in this figure, the wireless charging system 305 includes a vehicle 380, the vehicle comprising a plug-in hybrid electric vehicle (PHEV). In some examples, vehicle 380 may comprise an electrically powered vehicle without a combustion engine. Vehicle 380 may be an autonomous vehicle (AV) with self-driving capabilities. Details of an autonomous driving system is discussed with relation to FIG. 4. An alternating current (AC) power source 365 supplies power to a charging mat 350 via an electrical transmission cable 360. When AC power 365 is supplied to the charging mat 350, a magnetic field is generated wherein power is transmitted to a pickup mat 355 located on the vehicle 380 in a non-contact manner. More specifically, charging mat 350 contains a primary coil 310, and pickup mat 355 contains a secondary coil 315. When the primary coil is electrically charged, a magnetic field 320 is generated such that a current is induced in the secondary coil 315. Current induced in the secondary coil may be transmitted to an AC/DC rectifier 340, indicated by arrow 370, wherein alternating current may be converted into direct current for charging a battery 345, indicated by arrow 375.

The secondary coil 315 in the pickup mat 355 may be positioned in close proximity to an engine oil pan (storage reservoir) 335. As such, during an inductive charging operation where the primary coil 310 in the charging mat 350 is positioned in close proximity to the secondary coil 315 in the pickup mat 355, the primary coil may be further positioned in close proximity to the engine oil pan 335. If the engine oil pan 335 is comprised of ferrous material, as in, for example, the engine oil pan of a PHEV, the resulting magnetic field 320 from the primary coil 310 may inductively heat the engine oil pan. Alternatively, if the engine oil pan is not comprised of ferrous material, and instead is comprised of aluminum or plastic, for example, the magnetic field 320 generated from the primary coil 310 may be coupled to a ferrous member (not shown) that is in turn coupled to the engine oil pan 335 such that heat generated in the ferrous member may heat the engine oil pan 335. In some examples the ferrous member may comprise a metal plate, or existing ferrous material on the vehicle, for instance the vehicle frame, exhaust, or engine oil pan brackets.

Positioning the secondary coil 315 in close proximity to the engine oil pan 335 may not be practical in some instances, due to space constraints in the vehicle, for example. In such an example, the magnetic field 320 induced by the primary coil 310 may not sufficiently heat a ferrous engine oil pan 335, or in other words the magnetic field 320 from the primary coil 310 may be uncoupled from the ferrous engine oil pan 335. As described above, in such circumstances, the magnetic field 320 from the primary coil 310 may be coupled to the ferrous engine oil pan (or an aluminum or plastic tank) via a ferrous member. As such, even under circumstances where vehicle space is limited, heat may be effectively transferred to the engine oil pan during an inductive charging.

In one example, heating of the engine oil pan 335 may be carried out simultaneously while charging the battery 345. In another example, the engine oil pan 335 may be inductively heated by positioning the vehicle over the charging mat 350 even when battery charging is not desired. Prior to a scheduled engine start, the AV may maneuver itself (without an operator) over the charging mat 350 to preemptively heat the engine oil in the pan prior to engine start. In this way, the engine oil and in turn the engine may be heated prior to an actual engine start.

FIG. 4 is a block diagram of an example autonomous driving system 400 that may operate the vehicle system 100, described above at FIG. 1. Herein, the vehicle system 100 will be referred to simply as a "vehicle". The autonomous driving system 400, as shown, includes a user interface device 410, a navigation system 415, at least one autonomous driving sensor 420, and an autonomous mode controller 425.

The user interface device 410 may be configured to present information to vehicle occupants, under conditions wherein a vehicle occupant may be present. However, it may be understood that the vehicle may be operated autonomously in the absence of vehicle occupants, under certain conditions.

The presented information may include audible information or visual information. Moreover, the user interface device 410 may be configured to receive user inputs. Thus, the user interface device 410 may be located in the passenger compartment (not shown) of the vehicle. In some possible approaches, the user interface device 410 may include a touch-sensitive display screen.

The navigation system 415 may be configured to determine a current location of the vehicle using, for example, a Global Positioning System (GPS) receiver configured to triangulate the position of the vehicle relative to satellites or terrestrial based transmitter towers. The navigation system 415 may be further configured to develop routes from the current location to a selected destination, as well as display a map and present driving directions to the selected destination via, for example, the user interface device 410.

The autonomous driving sensors 420 may include any number of devices configured to generate signals that help navigate the vehicle. Examples of autonomous driving sensors 3420 may include a radar sensor, a lidar sensor, a vision sensor (e.g. a camera), vehicle to vehicle infrastructure networks, or the like. The autonomous driving sensors 420 may enable the vehicle to "see" the roadway and vehicle surroundings, and/or negotiate various obstacles while the vehicle 100 is operating in autonomous mode. The autonomous driving sensors 420 may be configured to output sensor signals to, for example, the autonomous mode controller 425.

The autonomous mode controller 425 may be configured to control one or more subsystems 430 while the vehicle is operating in the autonomous mode. Examples of subsystems 430 that may be controlled by the autonomous mode controller 425 may include a brake subsystem, a suspension subsystem, a steering subsystem, and a powertrain subsystem. The autonomous mode controller 425 may control any one or more of these subsystems 430 by outputting signals to control units associated with subsystems 430. In one example, the brake subsystem may comprise an anti-lock braking subsystem, configured to apply a braking force to one or more of wheels. Discussed herein, applying the braking force to one or more of the vehicle wheels may be referred to as activating the brakes. To autonomously control the vehicle, the autonomous mode controller 425 may output appropriate commands to the subsystems 430. The commands may cause the subsystems to operate in accordance with the driving characteristics associated with the selected driving mode. For example, driving characteristics may include how aggressively the vehicle accelerates and decelerates, how much the vehicle space leaves behind a front vehicle, how frequently the autonomous vehicle changes lanes, etc.

In this way, the components of FIGS. 1-4 enable an autonomous vehicle system comprising a controller with computer readable instructions stored on non-transitory memory to: during a first vehicle condition when the vehicle is operated without a human driver and when the vehicle is not being propelled by engine torque or motor torque, inductively heat engine oil via an external charging mat, and circulate heated engine oil through engine components, and during a second vehicle condition when the vehicle is operated without a human driver and when the vehicle is not being propelled by engine torque or motor torque, inductively charge an on-board battery via the external charging mat. The first vehicle condition including each of a shorter than threshold duration until an immediately subsequent engine start, a higher than threshold state of charge (SOC) of the battery powering the autonomous vehicle, and a lower than threshold engine oil temperature; and the second vehicle condition including a lower than threshold SOC of the battery.

Figure 5:
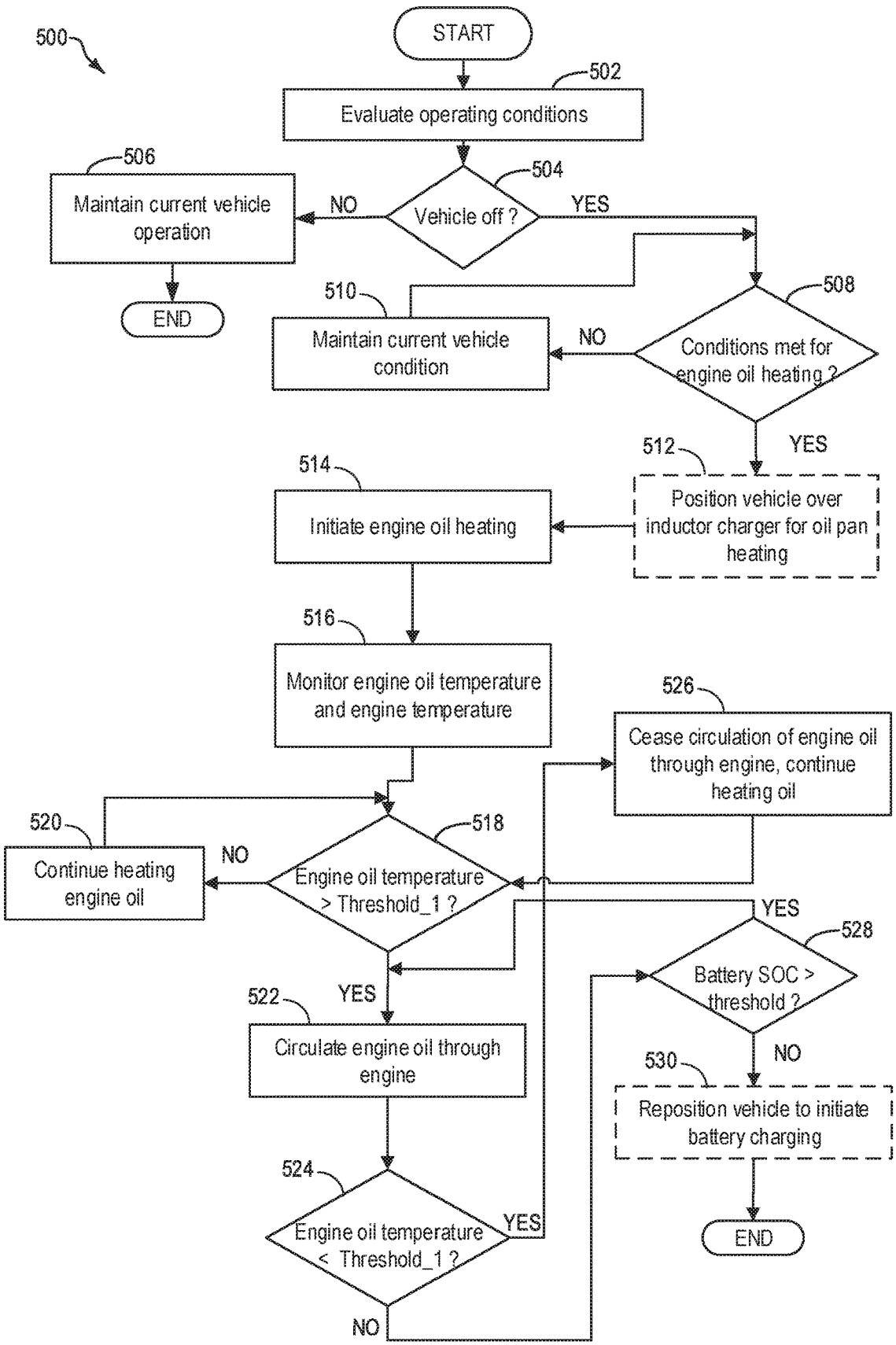
FIG. 5 shows a flowchart for an example method for warming engine oil and engine via inductive heating.
Figure 6:
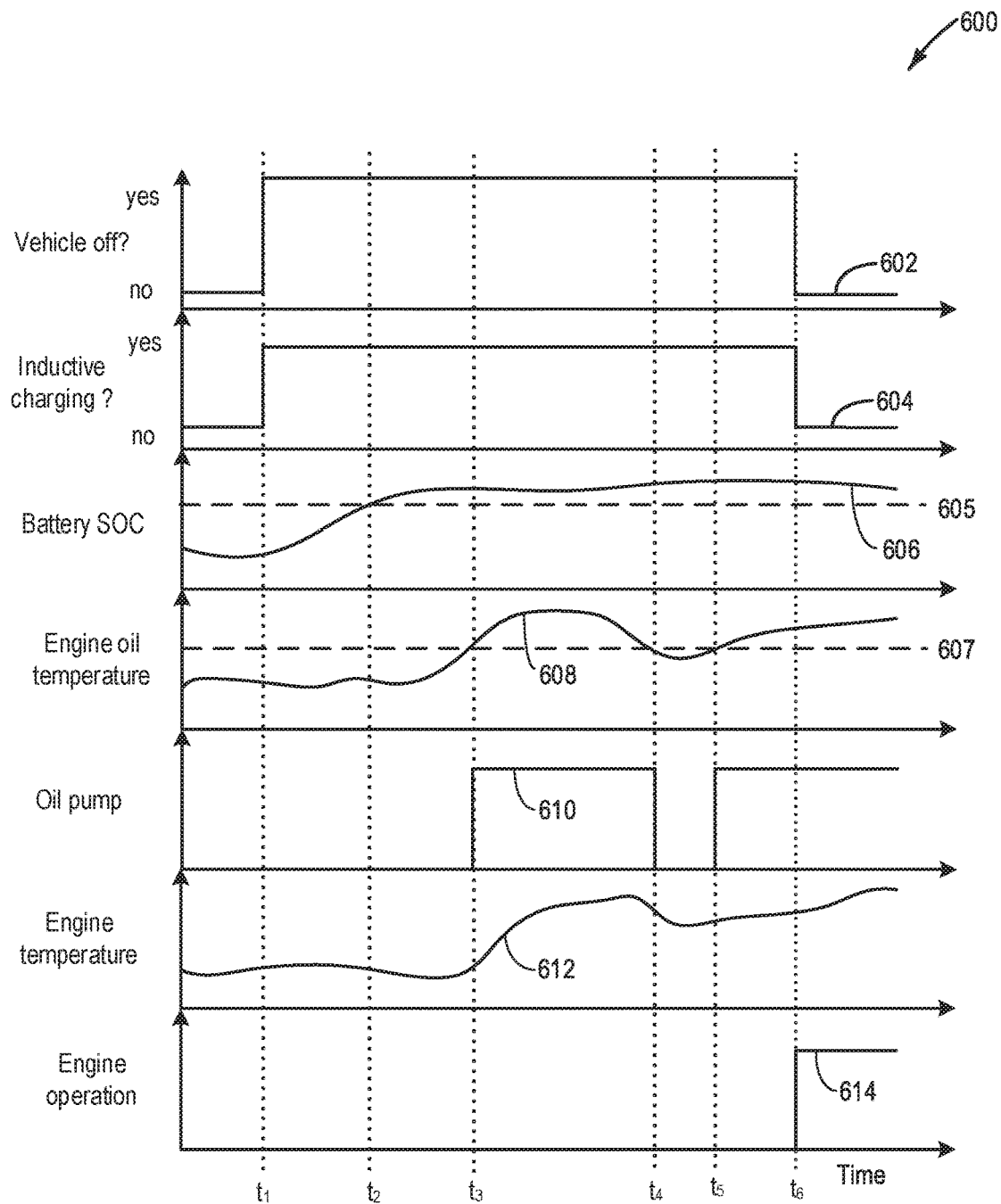
FIG. 6 shows a timeline of an example inductive heating of engine oil pan.

FIG. 5 shows an example method 500 that can be implemented to inductively heat engine oil and then circulate heated engine oil through the engine to warm up the engine prior to an engine start. Instructions for carrying out method 500 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 502, current vehicle operating conditions may be evaluated. Operating conditions may be estimated, measured, and/or inferred, and may include one or more vehicle conditions, such as vehicle speed, vehicle location, etc., various engine conditions, such as engine status, engine load, engine speed, A/F ratio, engine temperature, engine oil temperature, etc., as well as various ambient conditions, such as ambient temperature, humidity, barometric pressure, etc.

At 504, method 500 includes determining whether a vehicle-off condition is detected. A vehicle-off condition may be indicated by a key-off event, a user setting a vehicle alarm following exiting a vehicle that has been parked, a user depressing a button, or any other suitable indicator. During a vehicle key-off condition, the vehicle may be stationary, and may not be propelled using engine torque and/or machine torque.

If it is determined that the vehicle is not in a key-off condition, at 506, current vehicle conditions may be maintained. In one example, vehicle operations may include operating an engine oil pump to circulate engine oil from an engine oil pan (such as engine oil pan 270 in FIG. 1) through engine components. By circulating engine oil through the engine components, the engine components may be lubricated to reduce friction. Also, transmission system oil may be circulated through the transmission system for lubrication.

If it is determined that the vehicle is off, at 508, the routine includes determining if conditions are met for engine oil heating. Conditions for engine oil heating may include a lower than threshold duration until an immediately subsequent engine start. In one example, the threshold duration may include an amount of time desired to inductively heat engine oil to a threshold oil temperature. The threshold oil temperature may correspond to a temperature at which the viscosity of the engine oil is optimum for lubricating the engine components (when circulated through the engine components). The threshold oil temperature may be pre calibrated as a function of the engine oil properties such as viscosity. In another example, the threshold duration may include an amount of time desired to heat the engine components to an engine threshold temperature. Prior to engine start, inductively heated engine oil may be circulated through the engine to increase engine temperature to the threshold engine temperature. The threshold engine temperature may be pre-calibrated based on catalyst light-off temperature.

In one example, the immediately subsequent engine start may be indicated by the vehicle operator via a smartphone application or a remote (external to the vehicle) switch such as a switch on a key fob. Based on weather conditions, the operator may initiate heating/cooling of the vehicle cabin prior to vehicle operation. In another example, the immediately subsequent engine start may be predicted based on operator driving history. The prediction may be carried out while taking into account the current vehicle location, frequently travelled routes during the particular time of the day and the day of the week. As an example, an operator may drive the vehicle at a particular time in the day each weekday of the week.

Conditions for engine oil heating may also include a higher than threshold state of charge (SOC) of the vehicle battery. Battery power may be used to autonomously position the vehicle on top of an inductive charging mat. Also, battery power may be used to operate the pump of the engine oil system to circulate heated engine oil through the engine components, prior to engine start. In one example, the threshold SOC may correspond to the motor power required to position the vehicle and to circulate heated engine oil Further, conditions for engine oil heating may include a lower than the threshold engine oil temperature. Engine oil temperature may be estimated via an engine oil temperature sensor (such as temperature sensor 271 in FIG. 1). In one example, during high ambient heat conditions, the engine oil temperature may not decrease enough to reduce the viscosity of the oil. Also, conditions for engine oil heating may include a lower than the threshold engine temperature. The threshold engine temperature may be calibrated as a function of exhaust catalyst light-off temperature. In one example, the engine and the exhaust catalyst may continue to retain heat for a time period after engine-off.

In non-autonomous vehicles, conditions for engine oil heating may include, the vehicle being positioned over the charging mat such that the engine oil may be inductively heated. If it is determined that the conditions for engine oil heating are not met, at 510, current vehicle condition (vehicle key-off condition) may be maintained and engine oil heating may not be initiated.

If it is determined that the conditions for engine oil heating are met, at 512, the vehicle may be positioned over the inductor charger (mat) for heating the oil pan. In order to heat the oil pan, the vehicle may be positioned in a way that the oil pan is directly above the induction heater on the mat. The controller of the autonomous vehicle may determine the position of the mat using navigational sensors such as cameras attached to the vehicle body. In one example, dead reckoning process may be used to position the vehicle in longitudinal and lateral directions such that the oil pan is aligned with the heating element. The vehicle may maneuver such as by moving forward or reverse while turning the steering wheel.

If the vehicle includes a self-leveling suspension, the suspension may also be lowered to decrease the distance between the charging mat and the vehicle floor. In one example, if the vehicle is already placed over the charging mat (such as during charging), the vehicle may not be moved and the routine may directly proceed to step 514.

At 514, heating of the engine oil may be initiated. The controller may send a signal to the charging mat connected to an AC power source to initiate power supply to the charging mat. Once power is supplied to the mat, a magnetic field may be generated at a primary coil present in the mat. Since the engine oil pan is comprised of ferrous material, the resulting magnetic field from the primary coil may cause eddy current to flow through the surface of the ferrous oil pan or a ferrous member coupled to the pan, thereby producing heat at the engine oil pan. The close proximity of the oil pan to the charging mat may increase the amplitude of the Eddy currents.

At 516, engine oil temperature may be monitored based on readings from the engine oil temperature sensor. As the engine oil pan is heated, the temperature of the engine oil may increase. Also, engine temperature may be monitored based on readings of an engine coolant temperature sensor.

At 518, the routine includes determining if the engine oil temperature is higher than a threshold temperature (threshold_1). Threshold_1 may correspond to the temperature at which the viscosity of the engine oil is optimum for lubricating the engine components (when circulated through the engine components). Threshold_1 may be pre calibrated as a function of one or more of engine temperature, engine efficiency improvement factor per degree warm-up, emissions improvement factor per degree warm up, and oil pump energy consumption factor per degree warm up. In one example, engine efficiency improvement factor per degree warm-up may be estimated as the reduction in fuel consumption (due to reduced friction from improved lubrication) per degree increase in engine oil temperature. The emissions improvement factor per degree warm up may be estimated based on a change in emissions quality per degree increase in engine oil temperature. Circulation of heated engine oil may increase engine temperature, thereby expediting catalyst light off causing reduction in cold start emissions. The oil pump energy consumption factor per degree warm up may be estimated based on the amount of energy consumed by the oil pump (from the vehicle battery) to circulate oil from the oil pan through the engine components, per degree increase in engine oil temperature. If it is determined that the engine oil temperature is lower than Threshold_1, at 520, the engine oil may be continued to be inductively heated.

If it is determined that the engine oil temperature has increased to above the first threshold oil temperature, at 522, engine oil may be circulated through the engine components. The controller may send a signal to the variable flow oil pump to activate the pump for circulating engine oil through the engine. Also, the controller may send a signal to valve (such as valve 272 in FIG. 1) positioned between the output of the oil pump and an oil injector (such as oil injector 274 in FIG. 1) to open the valve. Once the valve is opened and the pump is operating, heated oil from the oil pump may be injected onto an engine component such as the underside of the piston, via the oil injector. After flowing through the engine components, the engine oil may flow back to the oil pan. While the engine oil is being circulated through the engine, heat from the oil may be transferred to the engine components and even though the oil may be continued to be inductively heated, temperature of engine oil in the oil pan may decrease.

At 524, the routine includes determining if the engine oil temperature (temperature of oil in the oil pan) has reduced to below Threshold_1. If the temperature of the engine oil reduces to below Threshold_1, an increase in engine temperature may not be achieved by circulating the colder engine oil. Also, operation of the pump may cause increased energy expenditure. Therefore, if the engine oil temperature is lower than Threshold_1, at 526, circulation of engine oil through the engine may be stopped while continuing inductive heating of the oil. The controller may send a signal to the oil pump to stop operation of the pump. As the engine oil heating is continued, the temperature of of in the pan may increase and the routine may then proceed to step 518 to determine if the oil temperature has increased to above Threshold_1.

If it is determined that the engine oil temperature is higher than Threshold_1, engine heating may be continued until the vehicle is started or until the engine temperature increases to above a threshold engine temperature. The threshold engine temperature may be calibrated as a function of catalyst light-off temperature.

At 528, the routine includes determining if the SOC of the vehicle battery is above the threshold SOC. In one example, the threshold SOC may correspond to the engine power required to position the vehicle and to circulate heated engine oil. If it is determined that the battery SOC is higher than the threshold SOC, engine oil circulation through the engine may be continued. However, if it is determined that the battery SOC is lower than the threshold SOC, at 530, for an autonomous vehicle, the vehicle may be repositioned to facilitate battery charging. The controller may maneuver the vehicle to position the vehicle on the mat in a manner that battery charging may be initiated. In one example, for certain vehicles (such as non-autonomous vehicle), the optimal position for battery charging mat be the same as that for heating the oil pan. For such vehicles, repositioning may not be needed to start charging the battery.

In this way, in response to a request for heating an engine prior to an engine start, an engine oil pan may be positioned directly above a charging mat coupled to a power supply, engine oil contained in the oil pan may be inductively heated, and heated engine oil may be circulated through the engine while maintaining a temperature of the engine oil above a threshold temperature.

FIG. 6 shows an example timeline 600 illustrating heating of engine oil and engine components prior to an engine start. The horizontal (x-axis) denotes time and the vertical markers t1-t6 identify significant times in the routine for engine oil and engine heating.

The first plot, line 602, shows if a vehicle operating condition such as if the vehicle if off or on. As discussed earlier, a vehicle-off condition may be indicated by a key-off event, a user setting a vehicle alarm following exiting a vehicle that has been parked, a user depressing a button, or other suitable indicator. A vehicle key-on condition may be indicated by the vehicle being propelled via engine torque or motor torque or the ignition switch being activated. The second plot, line 604, shows if the vehicle battery is being inductively charged over time. The third plot, line 606, shows a state of charge (SOC) of the vehicle battery. Power from the vehicle battery may be used to operate an oil pump (such as pump 275 in FIG. 1) and/or to propel the vehicle. Dashed line 605 shows a threshold battery SOC above which inductive heating of engine oil pan is initiated. The threshold SOC may be pre-calibrated based on the amount of power required to operate an engine oil pump to circulate heated engine oil through the engine components. The fourth plot, line 608 denotes change in engine oil temperature over time as estimated via an engine oil temperature sensor (such as temperature sensor 271 in FIG. 1) coupled to an engine oil pan (such as oil pan 270 in FIG. 1). Dashed line 607 denotes a threshold engine oil temperature below which the viscosity of the oil is too high to flow through the engine components providing lubrication. The threshold engine oil temperature may be calibrated based on engine oil viscosity index. The fifth plot, line 610, shows operation of the engine oil pump. The sixth plot, line 612, shows variation in engine temperature over time as estimated via an engine coolant temperature sensor. The seventh plot, line 614, shows operation of the engine when engine torque is used to propel the vehicle.

Prior to time t1, the vehicle is being operated using machine torque (engine not operational). As the engine is not operating, engine oil pump is not activated to circulate engine oil form the oil pan through the engine components. The engine oil temperature and the engine temperature may not change during this time. Since the vehicle is being operated using power from the on-board battery, the battery SOC decreases and the battery is not inductively charged.

At time t1, a vehicle-off condition is indicated and the vehicle is no longer propelled using machine torque and/or engine torque. Also, at time t1, inductive charging of the battery is initiated by positioning the vehicle over a charging mat connected to a power supply. A magnetic field created between a primary coil housed in the charging mat and a secondary coil housed in the vehicle (at vehicle floor) generates electricity for inductive charging of the battery. Between time t1 and t2, due to inductive charring, the battery SOC increases.

At time t2, a request for engine oil heating is received based on a scheduled engine start (at time t5). Preemptively heating the engine oil facilitates engine warm up prior to engine start. Since at time t2, the battery SOC is above the threshold 605, inductive heating of the oil pan is initiated. The vehicle is moved autonomously (without human driver) to position the charging mat immediately below the engine oil pan. Between time t2 and t3, the magnetic field from the primary coil in the charging mat may generate eddy currents on the surface of the oil pan which is made of a ferrous material. The eddy currents generate heat in the oil pan which in turn heats the engine oil contained in the pan. During this time (between time t2 and t3) inductive charging of the battery is also simultaneously carried out.

At time t3, in response to the engine oil temperature increasing to above the threshold temperature 607, the oil pump is activated to circulate engine oil through engine components such as piston, crankshaft, and engine cylinders. The controller sends a signal to an actuator of the pump to initiate pump operation. Also, the controller sends a signal to an actuator of a valve controlling flow of engine oil from the oil pan to the engine, to fully open the valve. Between time t3 and t4, as heated engine oil is circulated through the engine components, the engine temperature increases. However, since heat is transferred from the engine oil to the colder engine components, the temperature of engine oil returning to the oil pan reduces. Therefore, even as the oil pan is continued to be inductively heated, the colder engine oil returning to the oil pan decreases the overall engine oil temperature.

At time t4, in response to the engine oil temperature reducing to below the threshold temperature 607, the controller sends a signal to the oil pump to suspend operation such that circulation of engine oil through the engine components is suspended. Between time t4 and t5, the engine oil temperature increases as the oil is being inductively heated and not circulated through the colder engine components. At time t5, the engine oil temperature once again increases to above the threshold temperature and circulation of heated engine oil through the engine components is resumed by reactivating the oil pump. In this way, the engine is warmed up and lubricated with heated engine oil prior to an imminent engine start.

At time t6, vehicle operation is resumed and in response to operator torque demand, engine operation is initiated. The controller sends a signal to one or more fuel injectors to commence fuel injection to the engine cylinders while spark is also initiated. As the vehicle is moved away from the charging mat, inductive charging of the battery is discontinued. After time t6, the vehicle is continued to be propelled by engine torque. Since the engine is pre-lubricated and warm, upon engine start, frictional loss of power is reduced and emissions quality is improved.

In this way, by opportunistically heating engine oil via induction heating and then circulating the heated engine oil through the engine to increase the engine temperature, fuel efficiency and emissions quality at engine start may improve. The technical effect of simultaneously charging the vehicle battery and heating the engine oil pan via an inductive charging mat is that a plurality of functions may be accomplished with the same device without requirement of any additional hardware. By maneuvering an autonomous vehicle over a charging mat for engine oil heating, without interference of a human driver, engine oil and also the engine may be pre-heated without requirement of operator presence. Overall, by effectively warming the engine prior to an upcoming engine operation, range of operation of a plug-in hybrid vehicle and engine efficiency may be improved.

An example method comprises: prior to an engine start, inductively heating engine oil by coupling a magnetic field between a primary coil external to a vehicle and a ferrous oil pan or a ferrous member coupled to the oil pan, and circulating heated engine oil from the oil pan through one or more engine components during the heating. In any preceding example, additionally or optionally, the primary coil is housed in a charging mat connected to a power source, the charging mat positioned directly under the vehicle. In any or all of the preceding examples, additionally or optionally, inductively heating engine oil includes the magnetic field generating eddy currents at a surface of the oil pan, and the eddy currents generating thermal energy for heating the engine oil contained in the pan. In any of the preceding examples, additionally or optionally, circulating the heated engine oil includes, in response to an engine oil temperature increasing to a threshold temperature, operating an engine oil pump to circulate engine oil through the one or more engine components. In any or all of the preceding examples, the method further comprising, additionally or optionally, during circulating the heated engine oil, in response to the engine oil temperature decreasing to below the threshold temperature, pausing circulation of the heated engine oil while continuing to inductively heat the engine oil. In any or all of the preceding examples, additionally or optionally, the circulation of the heated engine oil is paused until the engine oil temperature increases to above the threshold temperature. In any or all of the preceding examples, additionally or optionally, inductive heating of the engine oil is initiated upon confirmation that each of a time remaining until the engine start is lower than a threshold duration and a state of charge (SOC) of a battery coupled to the vehicle is higher than a threshold SOC. In any or all of the preceding examples, additionally or optionally, the engine start is a scheduled engine start as indicated by an operator or a predicted engine start as estimated based on driving history of the operator. In any or all of the preceding examples, additionally or optionally, the vehicle is an autonomous vehicle, the method further comprising, immediately prior to inductively heating engine oil, moving the autonomous vehicle, without interference from a human driver, to position the oil pan directly above the primary coil. In any or all of the preceding examples, additionally or optionally, the vehicle is a hybrid electric vehicle, and the method further comprising, wirelessly charging the battery by coupling the magnetic field between the primary coil and a secondary coil onboard the vehicle. In any or all of the preceding examples, additionally or optionally, charging of the battery and inductive heating of the engine oil is carried out simultaneously.

Another engine example method comprises: in response to a request for heating an engine prior to an engine start, positioning an engine oil pan directly above a charging mat coupled to a power supply, inductively heating engine oil contained in the oil pan, and circulating heated engine oil through the engine while maintaining a temperature of the engine oil above a threshold temperature. In any preceding example, additionally or optionally, the request for heating the engine is based on each of a vehicle-off condition, a shorter than threshold duration until an immediately subsequent engine start, a higher than threshold state of charge (SOC) of a battery, and a lower than threshold engine temperature. In any or all of the preceding examples, additionally or optionally, the vehicle is an autonomous vehicle, and positioning the engine oil pan includes maneuvering the autonomous vehicle, without interference from a human operator, to align the engine oil pan directly above a primary coil housed in the charging mat. In any or all of the preceding examples, additionally or optionally, inductively heating the engine oil includes generating eddy currents at a surface of the oil pan from a magnetic field at the primary coil, the surface including a ferrous material. In any or all of the preceding examples, additionally or optionally, circulating the heated engine oil includes, operating an oil pump to circulate engine oil from the oil pan through the engine in response to engine oil temperature increasing to above the threshold temperature, pausing the oil pump operation in response to the engine oil temperature reducing to below the threshold temperature, and then resuming the oil pump operation to circulate engine oil through the engine in response to the engine oil temperature increasing to the threshold temperature.

In yet another example, an autonomous vehicle system comprising, a controller with computer readable instructions stored on non-transitory memory to: during a first vehicle condition when the vehicle is operated without a human driver and when the vehicle is not being propelled by engine torque or motor torque, inductively heat engine oil via an external charging mat, and circulate heated engine oil through engine components, and during a second vehicle condition when the vehicle is operated without a human driver and when the vehicle is not being propelled by engine torque or motor torque, inductively charge an on-board battery via the external charging mat. In any preceding example, additionally or optionally, the first vehicle condition includes, each of a shorter than threshold duration until an immediately subsequent engine start, a higher than threshold state of charge (SOC) of the battery powering the autonomous vehicle, and a lower than threshold engine oil temperature; and the second vehicle condition includes a lower than threshold SOC of the battery. In any or all of the preceding examples, additionally or optionally, the external charging mat includes a primary oil generating a magnetic field, and during the first condition, a suspension is lowered to position an oil pan containing the engine oil directly above the charging mat, and during the second condition, the battery is positioned directly over the charging mat without lowering the suspension. In any or all of the preceding examples, additionally or optionally, circulation of heated engine oil through engine components includes, in response to engine oil temperature being above a threshold temperature, operating an oil pump coupled between the oil pan and an engine oil injector to deliver engine oil to engine components including pistons, crankshafts, and combustion chambers.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    prior to an engine start,
        inductively heating engine oil by coupling a magnetic field between a primary coil external to a vehicle and a ferrous oil pan or a ferrous member coupled to an oil pan, wherein the inductive heating occurs within a threshold duration prior to the engine start; and
    circulating heated engine oil from the oil pan through one or more engine components during the heating,
        wherein the threshold duration is based on a viscosity of the engine oil.

2. The method of claim 1, wherein the primary coil is housed in a charging mat connected to a power source, the charging mat positioned directly under the vehicle.

3. The method of claim 1, wherein inductively heating engine oil includes the magnetic field generating eddy currents at a surface of the ferrous oil pan, and the eddy currents generating thermal energy for heating the engine oil contained in the oil ferrous pan.

4. The method of claim 1, wherein circulating the heated engine oil includes, in response to an engine oil temperature increasing to a threshold temperature, operating an engine oil pump to circulate engine oil through the one or more engine components, while the vehicle is not in operation.

5. The method of claim 4, further comprising, during circulating the heated engine oil, in response to the engine oil temperature decreasing to below the threshold temperature, pausing circulation of the heated engine oil while continuing to inductively heat the engine oil, while the vehicle continues to not be in operation.

6. The method of claim 5, wherein the circulation of the heated engine oil is paused until the engine oil temperature increases to above the threshold temperature.

7. The method of claim 1, wherein inductive heating of the engine oil is initiated upon confirmation that each of a time remaining until the engine start is lower than the threshold duration and a state of charge (SOC) of a battery coupled to the vehicle is higher than a threshold SOC.

8. The method of claim 7, wherein the vehicle is a hybrid electric vehicle, and the method further comprising, wirelessly charging the battery by coupling the magnetic field between the primary coil and a secondary coil onboard the vehicle.

9. The method of claim 8, wherein charging of the battery and inductive heating of the engine oil is carried out simultaneously.

10. The method of claim 1, wherein the engine start is a scheduled engine start as indicated by an operator or a predicted engine start as estimated based on driving history of the operator.

11. The method of claim 1, wherein the vehicle is an autonomous vehicle, the method further comprising, prior to inductively heating engine oil, moving the autonomous vehicle to position the oil pan directly above the primary coil.

12. An engine method, comprising:
    estimating an engine oil temperature prior to an engine start,
    in response to each of a lower than threshold engine oil temperature and a request for heating an engine prior to the engine start,
        positioning an engine oil pan directly above a charging mat coupled to a power supply,
        inductively heating engine oil contained in the oil pan, and
        circulating heated engine oil through the engine while maintaining a temperature of the engine oil above a threshold temperature.

13. The method of claim 12, wherein the request for heating the engine is based on each of a vehicle-off condition, a shorter than threshold duration until a subsequent engine start, a higher than threshold state of charge (SOC) of a battery, and a lower than threshold engine temperature.

14. The method of claim 12, wherein the vehicle is an autonomous vehicle, positioning the engine oil pan includes maneuvering the autonomous vehicle to align the engine oil pan directly above a primary coil housed in the charging mat.

15. The method of claim 14, wherein inductively heating the engine oil includes generating eddy currents at a surface of the oil pan from a magnetic field at the primary coil, the surface including a ferrous material.

16. The method of claim 12, wherein circulating the heated engine oil includes, operating an oil pump to circulate engine oil from the oil pan through the engine in response to engine oil temperature increasing to above the threshold temperature, pausing the oil pump operation in response to the engine oil temperature reducing to below the threshold temperature, and then resuming the oil pump operation to circulate engine oil through the engine in response to the engine oil temperature increasing to the threshold temperature.

17. An autonomous vehicle system, comprising:
a controller with computer readable instructions stored on non-transitory memory to:
during a first vehicle condition when the vehicle is not being propelled by engine torque or motor torque, and prior to an engine start, inductively heat engine oil via an external charging mat, and circulate heated engine oil through engine components, wherein the engine oil is inductively heated within a threshold duration prior to the engine start, and
during a second vehicle condition when the vehicle is not being propelled by engine torque or motor torque, inductively charge an on-board battery via the external charging mat,
wherein the threshold duration is based on a viscosity of the engine oil.

18. The system of claim 17, wherein the first vehicle condition includes a higher than threshold state of charge (SOC) of the battery powering an autonomous vehicle, and a lower than threshold engine oil temperature; and wherein the second vehicle condition includes a lower than threshold SOC of the battery.

19. The system of claim 17, wherein the external charging mat includes a primary coil generating a magnetic field, and during the first vehicle condition, a suspension is lowered to position an oil pan containing the engine oil directly above the external charging mat, and during the second vehicle condition, the battery is positioned directly over the external charging mat without lowering the suspension.

20. The system of claim 17, wherein circulation of heated engine oil through engine components includes, in response to engine oil temperature being above a threshold temperature, operating an oil pump coupled between an oil pan and an engine oil injector to deliver engine oil to engine components including pistons, crankshafts, and combustion chambers.

* * * * *